United States Patent [19]
Ryan

[11] Patent Number: 5,265,931
[45] Date of Patent: Nov. 30, 1993

[54] DETACHABLE CHILD SEAT AND SUPPORTING FRAME

[75] Inventor: Stephen E. Ryan, Mississauga, Canada

[73] Assignee: Ontario Cripple Children's Centre, Ontario, Canada

[21] Appl. No.: 789,233

[22] Filed: Nov. 7, 1991

[51] Int. Cl.[5] .................. A47C 13/00; A47D 1/10
[52] U.S. Cl. .................. 297/130; 297/250.1
[58] Field of Search ............ 297/130, 254, 255, 256, 297/250, 440, 444

[56] References Cited

U.S. PATENT DOCUMENTS

| | | |
|---|---|---|
| D. 294,777 | 3/1988 | Wise et al. . |
| 3,290,050 | 12/1966 | Ezquerra ............... 297/130 X |
| 3,649,074 | 3/1972 | McDonald et al. ....... 297/130 X |
| 3,659,865 | 5/1972 | Nothacker .............. 297/118 X |
| 3,829,113 | 8/1974 | Epelbaum .............. 297/254 X |
| 4,634,177 | 1/1987 | Meeker . |
| 4,685,688 | 8/1987 | Edwards . |
| 4,709,960 | 12/1987 | Launes . |
| 4,729,600 | 3/1988 | Single, II et al. . |
| 4,743,063 | 5/1988 | Foster, Jr. . |
| 4,750,783 | 6/1988 | Irby et al. ............... 297/130 X |
| 4,786,064 | 11/1988 | Baghdasarian . |
| 4,790,593 | 12/1988 | Davalos et al. . |
| 4,852,894 | 8/1989 | Dyer . |
| 4,902,026 | 2/1990 | Maldonado . |
| 4,915,446 | 4/1990 | Darling et al. . |
| 4,921,261 | 5/1990 | Sadler, Jr. et al. . |
| 4,943,113 | 7/1990 | Meeker . |
| 4,971,392 | 11/1990 | Young . |
| 5,022,669 | 6/1991 | Johnson . |

Primary Examiner—Peter R. Brown
Attorney, Agent, or Firm—Shefte, Pinckney & Sawyer

[57] ABSTRACT

An infant/child seat and frame combination is disclosed wherein the seat is mountable and de-mountable to and from the frame by a combination of seat back hooks and seat bottom positioning elements engageable with compatibly configured frame members on the frame. Various frame configurations may be constructed to accept the seat, e.g., a car seat frame, a stroller frame, a high chair frame, or a wheelchair frame, so that the same seat may be moved from one frame to another to serve varying purposes.

18 Claims, 2 Drawing Sheets

DETACHABLE CHILD SEAT AND SUPPORTING FRAME

BACKGROUND OF THE INVENTION

The present invention relates generally to seats intended for infants and other small children and, more particularly, to such seats which are designed to be susceptible of multiple uses.

A wide variety of seat structures are commonly available and in widespread use for seated or reclining support of infants and other small children in a variety of situations, including for example automobile car seats designed for securement to an automobile seat by a conventional safety belt, wheeled push-type strollers and carriages, standstill high chairs for use during feeding of an infant or other child, and wheelchairs for disabled children. For the most part, such seating structures are designed and intended for one use only and generally are not conveniently adaptable for other uses. For example, while the ability of a car seat to be selectively belted in and unbelted from a automobile seat makes such seating structures theoretically useable for infant seating elsewhere, conventional car seats are seldom put to other uses primarily because their size and bulk make them generally inconvenient to install and remove from an automobile seat on a recurring basis and their safety straps are generally not easily removable or movable out of the way to better facilitate use as a general purpose seat outside an automobile.

To partially address these problems, it has been proposed to construct an infant/child car seat of two separable components: a base or frame securable on an automobile seat by its safety belt and a seat which may be selectively mounted and de-mounted to and from the base or frame, providing the advantage of enabling the base or frame to generally always be left in an automobile secured in place by a seat belt while the seat may be mounted on the base or frame when necessary to transport an infant or child but removed from the base or frame for use as a child carrier or general purpose seat when the infant or child is not traveling. Representative examples of this type of car seat construction are disclosed in U.S. Pat. Nos. 4,634,177; 4,729,600; Des. 294,777; 4,743,063; 4,915,446; and 4,943,113. While these structures generally function satisfactorily in the manner intended, none of these prior structures contemplate the possibility of mounting the removable seat to an auxiliary or secondary frame or base when removed from the automobile base or frame, so that the range of uses of the seat component of these structures outside the automobile are relatively limited.

SUMMARY OF THE INVENTION

It is accordingly an object of the present invention to provide an improved combination of a child seat and a supporting frame adapted for selective mounting and de-mounting of the child seat to and from the frame. A more specific object of the present invention is to provide such a combined seat and frame structure wherein the seat component is susceptible of a variety of diverse uses. In particular, the present invention has as one object the provision of a variety of supporting frames to which the seat component can be selectively mounted and de-mounted in like manner to enable the seat to be used as a child's car seat, stroller, high chair, or wheelchair. Other objects of the present invention will become apparent from the following specification.

Briefly summarized, in the combination of the present invention, the child seat component basically comprises a seat bottom and a seat back attached angularly to one another to cooperatively define a forward seating surface and rearward mounting surface. At the rearward mounting surface, a frame attachment arrangement is affixed to the seat back and a positioning arrangement extends downwardly from the seat bottom, the positioning arrangement having a locking recess formed therein. The supporting frame component defines a receiving area for disposition therein of the seat component, the supporting frame having a generally horizontal bottom frame member for engagement with the seat bottom of the child seat at the rearward mounting surface and a back frame member spaced upwardly from the bottom frame member for abutment with the seat back of the child seat a the rearward mounting surface. The back frame member is configured for engagement by the frame attachment arrangement of the child seat and the bottom frame member defines an opening configured to receive the child seat positioning arrangement. The supporting frame further includes a latching mechanism mounted adjacent the bottom frame member for selective movement toward and away from the opening therein between a locking position for engagement in the recess of the child seat positioning arrangement when the child seat is disposed in the receiving are of the supporting frame and an open position to be out of contact with the child seat positioning arrangement to facilitate mounting and de-mounting of the child seat to and from the supporting frame.

In one embodiment, the supporting frame is configured for mounting on an automobile seat. In alternative embodiments, the supporting frame may be constructed in the form of a wheelchair frame, an infant stroller frame, or an infant high chair frame. Those persons skilled in the art will readily recognize that other frame embodiments are equally possible. In the car seat embodiment, the supporting frame defines a passage for receiving an automobile safety belt to secure the supporting frame to the automobile seat and the frame also includes a tether by which the frame may be affixed rigidly with respect to a frame member of the automobile.

In each such embodiment, the back frame member of the supporting frame is preferably arranged in a generally horizontal disposition and the attachment arrangement of the seat preferably comprises a hook arrangement such as a plurality of hooks spaced from one another on the seat back and opening downwardly for engagement vertically over the back frame member. The positioning arrangement of the seat is preferred to comprise a plurality of positioning elements projecting downwardly from the seat bottom at spacings from one another and the bottom frame member of the supporting frame is correspondingly formed with a respective plurality of the openings corresponding in shape, size, and spacing to the positioning elements. For example, the positioning elements may be generally cylindrical in shape with the openings being circular in shape. In such embodiment, each positioning element has its locking recess formed annularly thereabout and a corresponding plurality of the latching mechanisms are positioned for locking engagement and disengagement with the annular recesses in the cylindrical positioning elements. Preferably, each latching mechanism includes a locking element engageable in the locking recess of one positioning element and a biasing device such as a spring for normally urging the locking element into its locking position while being yieldable for movement of the locking element into the open position.

DESCRIPTION OF THE PREFERRED EMBODIMENTS

Figure 1:
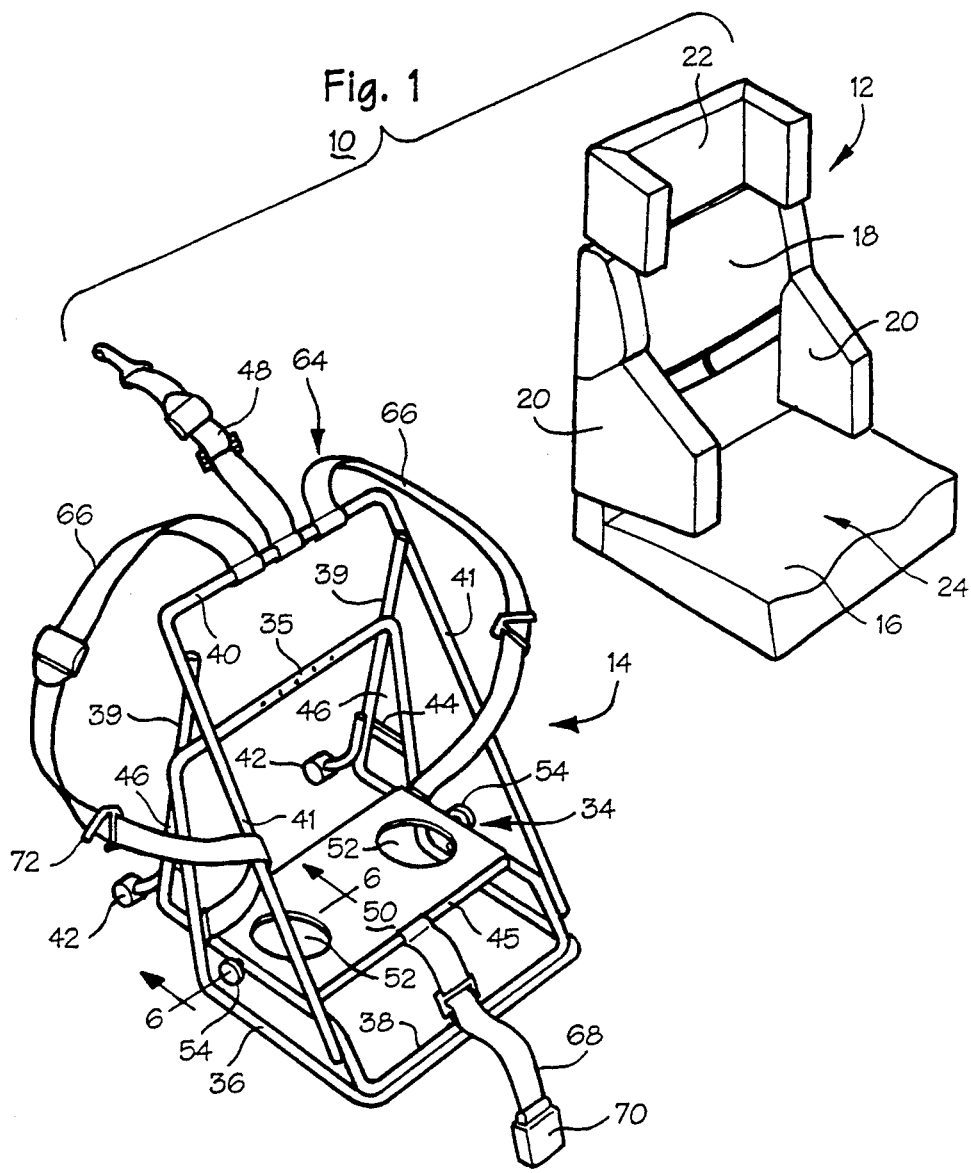
FIG. 1 is an exploded perspective view of a combined child seat and supporting frame according to one preferred embodiment of the present invention adapted for use of the seat as a child's automobile car seat.
Figure 2:
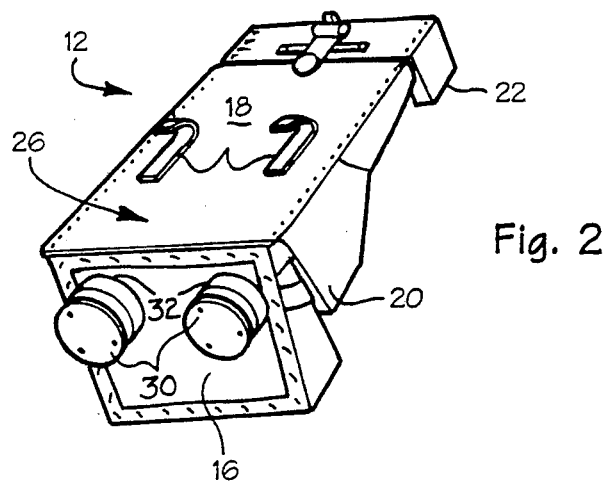
FIG. 2 is a rear perspective view of the seat component thereof.

Referring now to the accompanying drawings and initially to FIGS. 1 and 2, one embodiment of the combined child seat and supporting frame is indicated collectively at 10 and basically comprises a seat component 12 and a frame component 14 compatibly constructed to allow selective mounting and de-mounting of the seat 12 to and from the frame 14. In the embodiment of FIG. 1, the frame 14 is constructed to be specifically adaptable for mounting on an automobile seat (not shown) to enable the combined structure 10 to be useable as a child's car seat.

As seen in FIGS. 1 and 2, the seat 12 basically includes a generally flat seat bottom 16 and a generally flat seat back 18 hingedly affixed at an approximately 95° angle (or other suitable seating angle) with respect to one another. For added support, side cushions 20 are provided at the opposite sides of the seat back and seat bottom 16,18 at the juncture therebetween and a headrest 22 is mounted at the upper end of the seat back 18. The seat bottom, seat back, side cushions, and headrest of the seat 12 may be of substantially any conventional construction, such as by way of example, having relatively rigid internal frame components (not shown) rigidly affixed to one another and covered outwardly by foam pads or other cushions and by a suitable upholstery material, as representatively illustrated in FIGS. 1 and 2. Thus, one advantage of the present invention is that it enables any of a variety of seats and seat types, including specialty and customized seats such as commonly employed for children having physical disabilities, to be mounted to a common mass-produced frame.

As so constructed, the seat bottom 16 and seat back 18 of seat component 12 define a forward seating surface 24 of a suitable configuration for a child to sit upright thereon and an opposite rearward mounting surface 26 by which the seat 12 may be attached and detached to and from the frame 14. For this purpose, a pair of downwardly opening hooks 28 are affixed to the seat back 18 at the rearward mounting surface 26 at horizontal spacings from one another adjacent the upright lateral side edges of the seat back 18 and a pair of cylindrical positioning elements 30 are affixed to and project downwardly from the seat bottom 16 at the rearward mounting surface 22 at horizontal spacings from one another adjacent the opposite lateral side edges of the seat bottom 16. Each positioning element 30 is formed about its full circumferential extent with an annular locking recess 32.

The frame 14 is fabricated of tubular steel or another suitably strong material in a generally right triangular configuration defining a central receiving area 34 of a size and shape adapted for disposition therein of the seat 12. More particularly, the frame 14 includes a base formed of a rectangular frame member 36 bent at an obtuse angle approximately mid-way along each opposite lengthwise side thereof and a first generally U-shaped frame member 38 affixed continuously along the forward side of the rectangular frame member 36 with right angle arms 39 extending rearwardly and upwardly therefrom to and beyond respective points of connection to the opposite rearward corners of the rectangular frame member 36. Another U-shaped frame member 40 is oriented in inverted forwardly inclined disposition with each of its opposite lateral arms 41 affixed to the opposite ends of the respective right angle arms 39 of the frame member 38. A strut 44 extends horizontally between the respective lateral arms 39 and the lateral sides of the frame members 36,38 to provide an elevated support for an automobile safety belt, such as hereinafter more fully described, and also to additionally rigidify the frame members 36,38 with respect to one another. A pair of stabilizer struts 45 (only one of which is visible in FIG. 1) are affixed to and extend in parallel spaced relation transversely between the opposed lateral arms 39 of the U-shaped frame member 38 at forward and rearward dispositions along their horizontal extent. A pair of stabilizer legs 42 are affixed to and extend rearwardly and downwardly from the respective right angle arms 39 of the frame member 38 adjacent the right angle bends therein for cooperation with the frame member 36 to support the frame 14 on an automobile seat. Alternatively, it is contemplated that the legs 42 may be movable for selective positioning of the frame 14 at varying angles of inclination relative to the supporting automobile seat.

By this configuration, the rectangular frame member 36 together with the stabilizer legs 42 form a bottom base by which the frame 14 may be situated on an automobile seat with the stabilizer legs 42 and the upper transverse portion of the inverted U-shaped frame member 40 abutted against the automobile seat back. A passage 46 is defined at each opposite side of the frame 14 above the struts 44 and between the rectangular frame member 36 and the right-angle arms 39 of the frame member 38, through which a safety belt of the automobile seat ma be secured to hold the frame 14 rigidly with respect to the automobile seat. As a supplementary means of securement, the frame 14 may additionally be equipped with an adjustable tether strap 48 affixed centrally to the upper transverse portion of the inverted U-shaped frame member 40 for rigid affixation to a suitable frame component of the automobile. For example, if the frame 14 is mounted on the rear seat of a conventional automobile sedan, the tether 48 could be secured to the automobile's rear shelf behind the rear seat.

Figure 6:
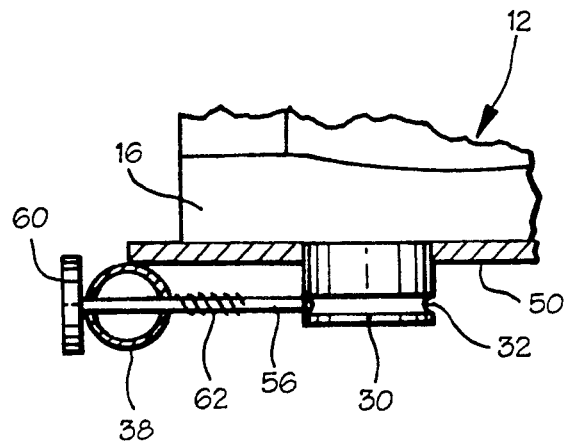
FIG. 6 is a cross-sectional view of the assembled seat and frame of FIG. 1 taken along line 6—6 thereof.

The frame 14 also includes a platform frame member 50 affixed to the forward and rearward stabilizer struts 45 and extending transversely between the horizontal portions of the lateral arms 39, thereby to provide a resting platform for the seat 12. The platform frame member 50 is formed with a pair of circular openings 52 formed of a diameter and at a lateral spacing from one another in correspondence to the cylindrical positioning elements 30 on the underside of the seat bottom 16 so that the positioning elements 30 may be received by and project through the openings 52 when the seat bottom 16 of the seat 12 is rested on the upwardly facing surface of the platform member 50. A latching mechanism 54 is mounted to the opposite lateral arms of the U-shaped frame member 38 directly adjacent the opposite lateral side edges of the platform frame member 50 to extend inwardly therebelow toward the openings 52. As best seen in FIG. 6, each latching mechanism 54 includes a bolt 56 slidably extending through a horizontal opening in the respective arm of the frame member 38 for sliding movement radially toward and away from the adjacent opening 52 in the platform member 50. The laterally outward end of each bolt 16 carries an enlarged operating knob 60, and a coil spring 62 is affixed concentrically about each bolt 56 laterally inwardly from its respective supporting frame member 38 to urge the bolt 56 radially inwardly with respect to the adjacent opening 52 into a normal disposition wherein the inward end of the bolt 56 is disposed for engagement in the annular locking recess 32 of a respective positioning element 30 when the seat 12 is placed on the platform frame member 50. Each bolt 56 is retractable by operation of its knob 60 away from the adjacent opening 52 and can be held in such retracted position, e.g., by a retaining mechanism (not shown) actuated by partial rotation of the bolt 56, to facilitate mounting and demounting of the seat 12 as described below.

A conventional set of restraining straps, generally indicated at 64, are affixed to the frame 14 for securing a child in the seat 12 when the seat 12 is mounted to the frame 14. More specifically, a pair of adjustable-length shoulder straps 66 are each affixed at one end to the upper transverse portion of the inverted U-shaped frame member 40 at one side of the tether 48 and at the opposite strap end to the juncture between the rectangular frame member 36 and the U-shaped frame member 38. A crotch strap 68 is affixed at one end centrally along the length of the stabilizer strut 45 at the forward side of the platform frame member 50, the opposite end of the crotch strap 68 being free and having a buckle 70 affixed thereto. Each shoulder strap 66 carries a tongue portion 72 engageable in the buckle 70. Accordingly, in the assembled condition of the seat 12 and frame 14, a child sitting on the forward seating surface 24 may be restrained in place by placing the shoulder straps 66 respectively over the child's shoulders, bringing the crotch strap 68 upwardly between the child's legs and securing each tongue 72 of the shoulder straps 66 in the crotch strap buckle 70.

In use, the seat 12 is mounted to the frame 14 by initially retracting the latching mechanisms 54 and then inserting the seat 12 into the central receiving area 34 of the frame 14 in upright disposition with the seating surface 24 facing forwardly with respect to the frame 14, engaging the hooks 28 on the seat back 18 over the rearward transverse side 35 of the rectangular frame member 36, and simultaneously positioning the seat bottom 16 into abutting superposed facing disposition on the platform frame member 50 With the cylindrical positioning elements 30 fully extending downwardly through the corresponding circular openings 52. By then releasing the bolts 56 of the latching mechanisms 54, the positioning elements 30 may be secured in place by engagement of each bolt 56 in the locking recess 32 of the respectively adjacent positioning element 30. Advantageously, the hinged connection of the seat bottom and seat back 16, 18 simplifies and makes easier this installation procedure. This means of mounting of the seat 12 to the frame 14 securely rigidifies the seat 12 to the frame 14 to form them as an integral unit suitable for safe use as an infant or child's car seat as aforedescribed, while at the same time enabling the seat 12 to be conveniently separated from the frame 14 merely by disengaging the latching mechanisms 54 and lifting the seat 12 upwardly from the frame 14 to disengage the hooks 28. The frame 14 may therefore be conveniently left secured in place on an automobile seat by a conventional seat belt in conjunction with the tether 48 while the seat 12 is utilized for various other seating purposes when the child is not being transported in the automobile. Since the restraining straps 64 are affixed to the frame 14 rather than to the seat 12, the seat 12 is free of interference by such straps 64 when removed from the frame 14, thereby facilitating other uses of the seat 12.

From the foregoing disclosure of the convenient and simple mounting system of the present invention provided by the combination of the hooks 28 and the positioning elements 30, those persons skilled in the art will readily recognize numerous possible uses of the seat 12 when removed from the car seat frame 14. By way of example, but without limitation, supporting frames to facilitate three such alternative uses are shown in FIGS. 3, 4, and 5.

Figure 3:
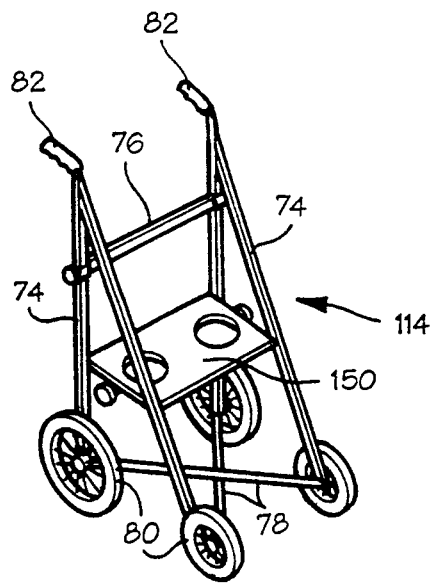
FIGS. 3, 4, and 5 are perspective views of alternative supporting frames to which the seat component of FIGS. 1 and 2 may also be mounted.

FIG. 3 illustrates a stroller frame, generally indicated at 114, configured for selective mounting thereon and removal therefrom of the seat 12 in substantially the same manner by which the seat 12 is mounted and demounted to and from the car seat frame 14 as above described. Specifically, the stroller frame 114 basically includes a pair of side frame members 74 of inverted V-shape affixed rigidly in spaced parallel relation to one another by an upper transverse member 76 extending horizontally therebetween at a spacing below their upper ends and a pair of lower connecting frame members 78 extending in crossing relation between the opposite lower ends of the side frame members 74. Four wheels 80 are mounted to the lower end of the stroller frame 14 at the connections between the side frame members 74 and the connecting frame members 78 and a pair of handles 82 are respectively affixed to the uppermost ends of the side frame members 74. A platform frame member 150, substantially identical in construction to the platform member 50 of FIG. 1, is mounted in horizontal disposition between the side frame members 74 generally mid-way along their length at a sufficient spacing below the transverse frame member 76 to enable to the seat 12 to be mounted to the stroller frame 14 by engagement of the hooks 28 over the transverse frame member 76 and simultaneous engagement of the seat bottom 16 and its positioning elements 30 with the platform frame member 150.

Figure 4:
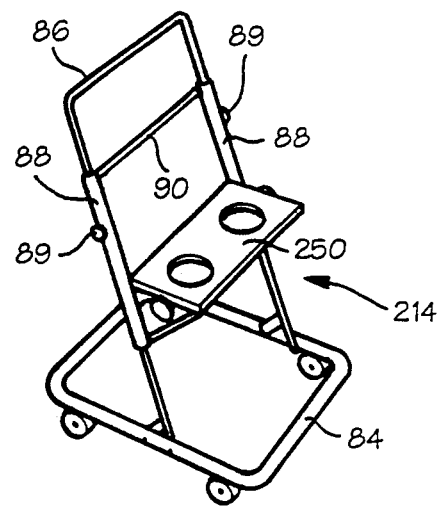

FIG. 4 illustrates another upstanding wheeled frame 214 to which the seat 12 may be mounted for use as a high chair or a general purpose so-called floor stander. Basically, the frame 214 includes a wheeled rectangular base 84 to which an inverted U-shaped frame member 86 is affixed in rearwardly angled upstanding disposition. A pair of sleeves 88 are telescopically mounted respectively on the laterally opposed arms of the U-shaped frame member 86 for selective positioning upwardly an downwardly therealong by spring-loaded latching mechanisms 89. Affixed transversely between the sleeves 88 are an upper horizontal frame member 90 and a lower horizontal platform frame member 250, which is of substantially identical construction to the platform frame member 50 of FIG. 1. Accordingly, the seat 12 may be selectively mounted and de-mounted to and from the frame 214 by engagement of the seat back hooks 28 over the horizontal frame member 90 and engagement of the seat bottom 16 and its positioning elements 30 with the platform frame member 250 in substantially the same manner as that by which the seat 12 is mounted and de-mounted to and from the car seat frame 14 as described above.

Figure 5:
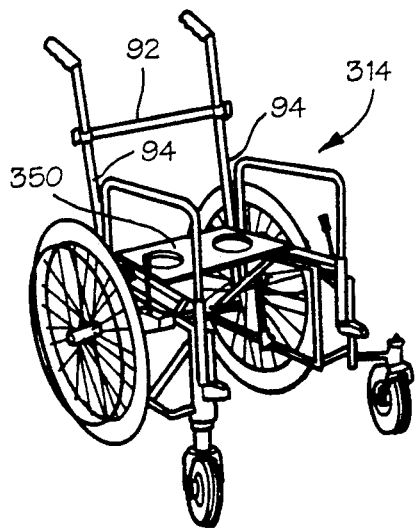

FIG. 5 shows a conventional wheelchair frame 314 which has been modified to provide an upper horizontal frame member 92 and a lower horizontal platform frame member 350, identical in construction to the platform frame member 50 of FIG. 1, extending transversely between side frame members 94 of the wheelchair frame 314 for mounting and de-mounting of the seat 12 to and from the upper frame member 92 and the platform frame member 350 in the same manner as described above. In this manner, the seat 12 may be utilized for transporting a disabled child in a automobile by mounting of the seat 12 to the car seat frame 14 and also for transporting the child when out of the automobile by mounting the seat 12 to the wheelchair frame 314, thereby eliminating the need to have a separate car seat and wheelchair seat insert for the child.

As a further alternative, it is contemplated that the frames of existing conventional child seating structures, such as high chairs, strollers, and the like, may be modified to be suitable for retrofit mounting and de-mounting of the seat 12 to and from such frames in the same manner as above described.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. The combination of a child seat and a supporting frame adapted for selective mounting and de-mounting of the child seat to and from the frame, the child seat comprising a seat bottom and a seat back attached angularly to one another to cooperatively define a forward seating surface and a rearward mounting surface, frame attachment means affixed to the seat back at the rearward mounting surface, and positioning means extending downwardly from the seat bottom the positioning means having a locking recess formed therein, and the supporting frame defining a receiving area for disposition therein of the child seat, the supporting frame having a generally horizontal bottom frame member for abutment with the seat bottom of the child seat at the rearward mounting surface and a back frame member spaced upwardly from the bottom frame member for engagement with the seat back of the child seat at the rearward mounting surface, the back frame member being configured for engagement by the child seat frame attachment means and the bottom frame member defining an opening configured to receive the child seat positioning means, and the supporting frame including latching means mounted adjacent the bottom frame member for selective movement toward and away from the opening therein between a locking position for engagement in the recess of the child seat positioning means when the child seat is disposed in the receiving area of the supporting frame and an open position to be out of contact with the child seat positioning means to facilitate mounting and de-mounting of the child seat to and from the supporting frame.

2. The combination of a child seat and a supporting frame according to claim 1 and characterized further in the child seat frame attachment means comprises a hook means on the seat back at the rearward mounting surface for hooking engagement about the back frame member.

3. The combination of a child seat and a supporting frame according to claim 1 and characterized further in that the back frame member of the supporting frame is arranged in a generally horizontal disposition.

4. The combination of a child seat and a supporting frame according to claim 3 and characterized further in that the frame attachment means comprises hook means arranged to open downwardly for engagement vertically over the back frame member of the supporting frame.

5. The combination of a child seat and a supporting frame according to claim 1 and characterized further in that the positioning means comprises a plurality of positioning elements projecting downwardly from the seat bottom at spacings from one another.

6. The combination of a child seat and a supporting frame according to claim 5 and characterized further in that the bottom frame member is formed with a respective plurality of the openings corresponding in shape, size, and spacing to the positioning elements.

7. The combination of a child seat and a supporting frame according to claim 6 and characterized further in that the positioning elements are generally cylindrical in shape and the openings are circular in shape.

8. The combination of a child seat and a supporting frame according to claim 7 and characterized further in that the locking recess is formed annularly in each positioning element.

9. The combination of a child seat and a supporting frame according to claim 8 and characterized further by a respective plurality of the latching means positioned for locking engagement and disengagement with the annular recesses in the cylindrical positioning elements.

10. The combination of a child seat and a supporting frame according to claim 1 and characterized further in that the latching means includes a locking element engageable in the locking recess and biasing means for normally urging the locking element into the locking position and yieldable for movement of the locking element into the open position.

11. The combination of a child seat and a supporting frame according to claim 1 and characterized further in that the supporting frame includes strap means for securely retaining a child seated on the seating surface.

12. The combination of a child seat and a supporting frame according to claim 1 and characterized further in that the supporting frame is configured for mounting on an automobile seat.

13. The combination of a child seat and a supporting frame according to claim 12 and characterized further in that the supporting frame defines a passage for receiving a automobile safety belt to secure the supporting frame to the automobile seat.

14. The combination of a child seat and a supporting frame according to claim 12 and characterized further in that the supporting frame includes tether means for affixing the supporting frame rigidly with respect to a frame member of an automobile.

15. The combination of a child seat and a supporting frame according to claim 1 and characterized further in that the supporting frame includes ground engaging wheels for rolling movement of the frame.

16. The combination of a child seat and a supporting frame according to claim 15 and characterized further in that the supporting frame comprises a wheelchair frame.

17. The combination of a child seat and a supporting frame according to claim 15 and characterized further in that the supporting frame comprises an infant stroller frame.

18. The combination of a child seat and a supporting frame according to claim 1 and characterized further in that the supporting frame comprises an infant high chair frame.

* * * * *

UNITED STATES PATENT AND TRADEMARK OFFICE
CERTIFICATE OF CORRECTION

PATENT NO. : 5,265,931
DATED : November 30, 1993
INVENTOR(S) : Stephen E. Ryan

It is certified that error appears in the above-identified patent and that said Letters Patent is hereby corrected as shown below:

Column 1, line 23, before "automobile" delete "a" and insert therefor -- an --.

Column 2, line 19, delete "a" and insert therefor -- at --.

Column 2, line 29, delete "are" and insert therefor -- area --.

Column 4, line 50, delete "ma" and insert therefor -- may --.

Column 5, line 15, delete "16" and insert therefor -- 56 --.

Column 5, line 61, delete "With" and insert therefor -- with --.

Column 6, line 42, delete "14" and insert therefor -- 114 --.

Column 6, line 65, delete "an" and insert therefor -- and --.

Column 7, line 21, before "automobile" delete "a" and insert therefor -- an --.

Column 9, line 8, delete "a" and insert therefor -- an --.

Signed and Sealed this

Twenty-sixth Day of July, 1994

Attest:

BRUCE LEHMAN

Attesting Officer

Commissioner of Patents and Trademarks